United States Patent
Ihara

(10) Patent No.: US 11,407,018 B2
(45) Date of Patent: Aug. 9, 2022

(54) STEEL SHEET MEMBER AND METHOD FOR PRODUCING THE SAME

(71) Applicant: TOYOTA JIDOSHA KABUSHIKI KAISHA, Toyota (JP)

(72) Inventor: Tomoaki Ihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 16/689,281

(22) Filed: Nov. 20, 2019

(65) Prior Publication Data

US 2020/0188980 A1 Jun. 18, 2020

(30) Foreign Application Priority Data

Dec. 13, 2018 (JP) .............................. JP2018-233850

(51) Int. Cl.
*B32B 3/00* (2006.01)
*B21D 22/02* (2006.01)
*C21D 9/46* (2006.01)

(52) U.S. Cl.
CPC ............. *B21D 22/022* (2013.01); *C21D 9/46* (2013.01); *C21D 2211/001* (2013.01); *Y10T 428/12201* (2015.01)

(58) Field of Classification Search
None
See application file for complete search history.

(56) References Cited

U.S. PATENT DOCUMENTS

| 5,687,538 | A | * | 11/1997 | Frobosilo | .................. E04C 3/07 52/847 |
| 6,261,702 | B1 | * | 7/2001 | McGuire | ................. B21B 1/227 428/600 |
| 2004/0201253 | A1 | | 10/2004 | Kitagawa et al. | |
| 2012/0040205 | A1 | * | 2/2012 | Lenze | .................. B21D 22/022 428/600 |
| 2012/0312065 | A1 | * | 12/2012 | Carter | .................... B21D 22/02 72/342.94 |
| 2018/0371573 | A1 | * | 12/2018 | Kwon | .................. B23K 26/364 |

FOREIGN PATENT DOCUMENTS

| CN | 102317001 A | 1/2012 |
| JP | 2003-312534 A | 11/2003 |
| JP | 2012-517901 A | 8/2012 |
| JP | 2017-170452 A | 9/2017 |

* cited by examiner

*Primary Examiner* — Seth Dumbris
(74) *Attorney, Agent, or Firm* — Oblon, McClelland, Maier & Neustadt, L.L.P.

(57) ABSTRACT

A method for producing a steel sheet member, includes: forming at least one pair of opposing strip grooves in a flat steel sheet such that one of the pair of opposing strip grooves is disposed in one of opposite surfaces of the steel sheet, the other of the pair of opposing strip grooves is disposed in the other of the opposite surfaces, and the strip grooves extend in a direction crossing a longitudinal direction of the steel sheet; heating the steel sheet having the strip grooves to a temperature higher than an austenite transformation finish temperature; and placing the heated steel sheet between an upper die and a lower die to press-form the steel sheet while cooling. When press-forming the steel sheet while cooling, there is space between each of the upper and lower dies and a bottom of a corresponding one of the strip grooves.

5 Claims, 9 Drawing Sheets

STEEL SHEET MEMBER AND METHOD FOR PRODUCING THE SAME

INCORPORATION BY REFERENCE

The disclosure of Japanese Patent Application No. 2018-233850 filed on Dec. 13, 2018 including the specification, drawings and abstract is incorporated herein by reference in its entirety.

BACKGROUND

1. Technical Field

The disclosure relates to steel sheet members and methods for producing the same.

2. Description of Related Art

In recent years, automotive structural members such as side members have been desired to have high strength and excellent shock absorption properties. Japanese Unexamined Patent Application Publication No. 2003-312534 (JP 2003-312534 A) discloses a technique in which a part of a steel sheet member with a hat-shaped section has a bellows structure in order to improve shock absorption properties.

SUMMARY

The inventors found the following points regarding steel sheet members and production methods thereof. The steel sheet member disclosed in JP 2003-312534 A has a complex, large configuration due to the bellows structure.

The disclosure provides a steel sheet member having a simple, compact configuration but still having excellent shock absorption properties and a method for producing such a steel sheet member.

A first aspect of the disclosure relates to a method for producing a steel sheet member. The method for producing a steel sheet member includes: forming at least one pair of opposing strip grooves in a flat steel sheet such that one of the pair of opposing strip grooves is disposed in one of opposite surfaces of the steel sheet, the other of the pair of opposing strip grooves is disposed in the other of the opposite surfaces, and the strip grooves extend in a direction crossing a longitudinal direction of the steel sheet; heating the steel sheet having the strip grooves to a temperature higher than an austenite transformation finish temperature; and placing the heated steel sheet between an upper die and a lower die to press-form the steel sheet while cooling. When press-forming the steel sheet while cooling, there is space between each of the upper and lower dies and a bottom of a corresponding one of the strip grooves.

In the above aspect, the at least one pair of opposing strip grooves in the opposite surfaces of the flat steel sheet extend in the direction crossing the longitudinal direction of the steel sheet. Accordingly, when press-forming the steel sheet while cooling, there is space between each of the upper and lower dies and the bottom of the corresponding one of the strip grooves. A part of the steel sheet which is located between the opposing strip grooves is therefore cooled more slowly than the other parts of the steel sheet, and a part of the produced steel sheet member which is located between the opposing strip grooves thus has a smaller proportion of martensite in its microstructure and is softer than the other parts of the steel sheet member. That is, the part of the steel sheet member which is located between the opposing strip grooves is softer and thinner than the other parts of the steel sheet member. This part therefore tends to be deformed and has excellent shock absorption properties. As described above, a steel sheet member merely having the strip grooves, namely having a simpler, more compact configuration than a steel sheet member with a bellows structure etc., but still having excellent shock absorption properties can be easily produced.

In the method according to the first aspect of the disclosure, when forming the strip grooves, a plurality of the pairs of strip grooves may be formed at predetermined intervals in the longitudinal direction of the steel sheet. This configuration further improves shock absorption properties.

In the method according to the first aspect of the disclosure, the strip grooves may extend in a direction perpendicular to the longitudinal direction of the steel sheet. With this configuration, the steel sheet member tends to be deformed in the axial collapse mode when subjected to an axial compressive load in the longitudinal direction of the steel sheet member. Shock absorption properties are thus improved.

In the method according to the first aspect of the disclosure, when press-forming the steel sheet while cooling, the steel sheet may be press-formed so as to have a hat-shaped section perpendicular to the longitudinal direction of the steel sheet. This method is suitable for steel sheet members having such a configuration.

A second aspect of the disclosure relates to a steel sheet member. The steel sheet member includes: at least one pair of opposing strip grooves formed in the steel sheet member such that one of the pair of opposing strip grooves is disposed in one of opposite surfaces of the steel sheet member, the other of the pair of opposing strip grooves is disposed in the other of the opposite surfaces, and the strip grooves extend in a direction crossing a longitudinal direction of the steel sheet member. A first part of the steel sheet member which is located between the opposing strip grooves is thinner and softer than a second part of the steel sheet member which does not have the strip grooves.

In the above aspect, the first part more tends to be deformed than the second part and thus have greater shock absorption properties than the second part. As described above, the steel sheet member according to the second aspect of the disclosure merely has the strip grooves, namely has a simpler, more compact configuration than a steel sheet member with a bellows structure etc., but still has excellent shock absorption properties.

In the steel sheet member according to the second aspect of the disclosure, the first part may have a smaller proportion of martensite in a microstructure than the second part. With this configuration, hardness of the first part can be easily reduced.

In the steel sheet member according to the second aspect of the disclosure, a plurality of the pairs of strip grooves may be formed at predetermined intervals in the longitudinal direction. This configuration further improves shock absorption properties.

In the steel sheet member according to the second aspect of the disclosure, the strip grooves may extend in a direction perpendicular to the longitudinal direction. With this configuration, the steel sheet member tends to be deformed in the axial collapse mode when subjected to an axial compressive load in the longitudinal direction of the steel sheet member. Shock absorption properties are thus improved.

In the steel sheet member according to the second aspect of the disclosure, the steel sheet member may be a vehicle member having a hat-shaped section perpendicular to the longitudinal direction. This steel sheet member is suitable for steel sheet members having such a configuration.

The disclosure provides a steel sheet member having a simple, compact structure but still having excellent shock absorption properties and a method for producing such a steel sheet member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A specific embodiment to which the disclosure is applied will be described with reference to the accompanying drawings. The disclosure is not limited to the following embodiment. For clarity, the following description and the drawings are simplified as appropriate.

First Embodiment

Production Method of Steel Sheet Member

First, a method for producing a steel sheet member according to a first embodiment will be described with reference to FIG. 1. The production method according to the first embodiment is suitable as a method for producing an automotive steel sheet member that is desired to have both high strength and excellent shock absorption properties. Examples of such a steel sheet member include vehicle members having a hat-shaped section perpendicular to their longitudinal direction, such as side members (e.g., front side members, rear floor side members) and pillars.

Figure 1:
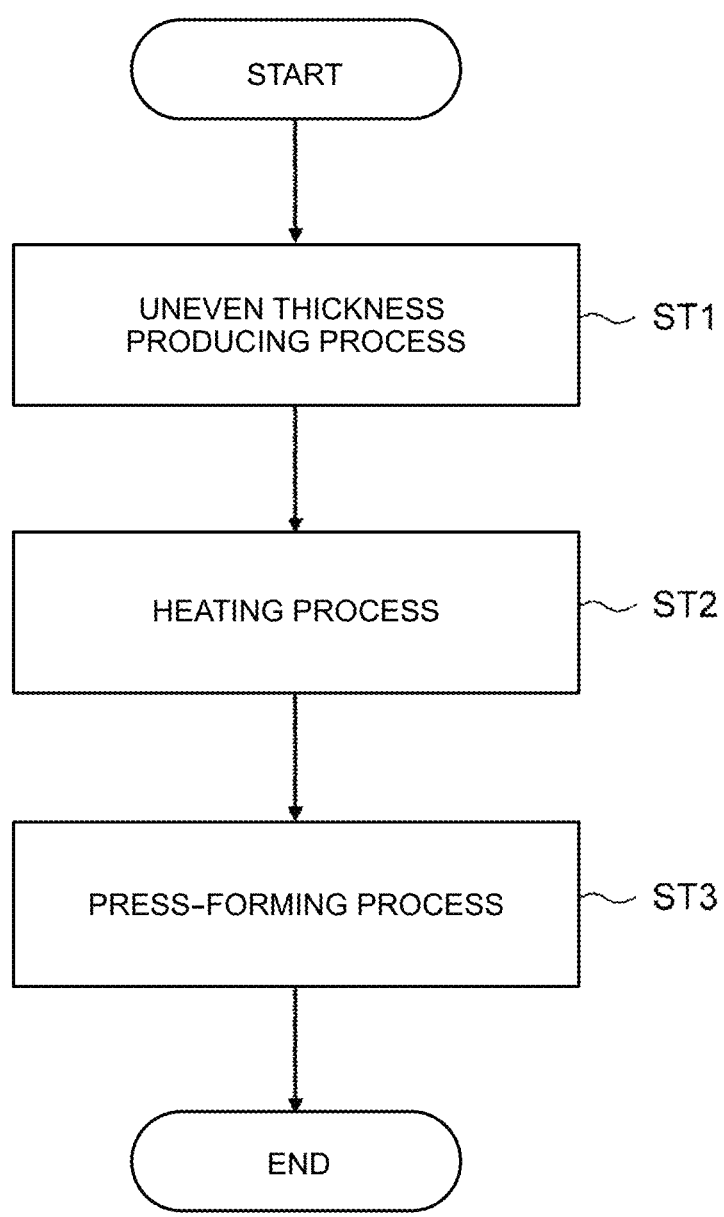
FIG. 1 is a flowchart illustrating a method for producing a steel sheet member according to a first embodiment.

FIG. 1 is a flowchart illustrating the method for producing a steel sheet member according to the first embodiment. As shown in FIG. 1, the production method according to the first embodiment includes an uneven thickness producing process (step ST1), a heating process (step ST2), and a press-forming process (step ST3)

Figure 2:
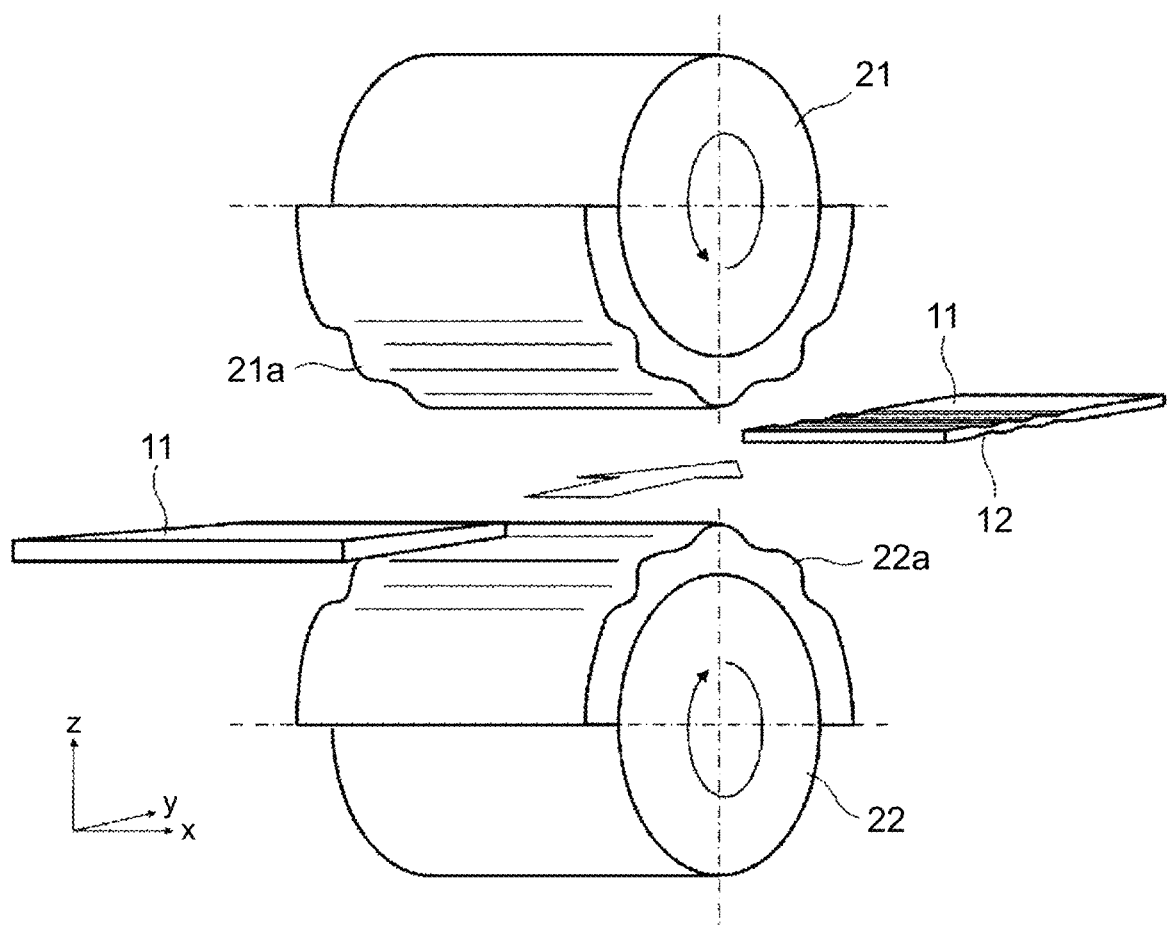
FIG. 2 is a perspective view illustrating an example of an uneven thickness producing process.

First, the uneven thickness producing process (step ST1) of FIG. 1 will be described. FIG. 2 is a perspective view illustrating an example of the uneven thickness producing process. As shown in FIG. 2, in the uneven thickness producing process (step ST1), opposite surfaces of a flat steel sheet 11 are pressed to form at least one pair of opposing strip grooves 12 on the opposite surfaces of the steel sheet 11 so that the steel sheet 11 has an uneven thickness. For example, as shown in FIG. 2, the flat steel sheet 11 is rolled (e.g., cold rolled) between an upper roll 21 and a lower roll 22 to form strip grooves 12 in the surfaces of the flat steel sheet 11.

More specifically, the upper roll 21 has a strip protrusion 21a for forming a strip groove 12. The strip protrusion 21a extends in the axial direction of the upper roll 21 (the x-axis direction) in the outer peripheral surface of the upper roll 21. Similarly, the lower roll 22 has a strip protrusion 22a for forming a strip groove 12. The strip protrusion 22a extends in the axial direction of the lower roll 22 (the x-axis direction) in the outer peripheral surface of the lower roll 22. The upper roll 21 and the lower roll 22 rotate so that the protrusion 21a of the upper roll 21 and the protrusion 22a of the lower roll 22 face each other with the steel sheet 11 interposed therebetween. At least one pair of opposing strip grooves 12 are thus formed in the upper and lower surfaces of the steel sheet 11.

The strip grooves 12 extend in a direction crossing the longitudinal direction of the steel sheet 11 (the y-axis direction). In the example of FIG. 2, the strip grooves 12 extend in a direction perpendicular to the longitudinal direction of the steel sheet 11 (i.e., extend in the x-axis direction). In the example of FIG. 2, three pairs of opposing strip grooves 12 are formed in the upper and lower surfaces of the steel sheet 11. That is, a plurality of pairs of strip grooves 12 are formed at predetermined intervals in the longitudinal direction of the steel sheet 11. The number of strip grooves 12 is not particularly limited.

The steel sheet 11 is, but not particularly limited to, a steel sheet for hot stamping made of, e.g., manganese-boron steel with a thickness of about 1 to 4 mm. The flat steel sheet 11 before the uneven-thickness producing process is a soft material having a microstructure of, e.g., ferrite and pearlite. The depth of the strip groove 12 is, e.g., about 0.1 to 1.0 mm.

It should be understood that the right-handed Cartesian coordinate system xyz in FIG. 2 and other figures is shown for convenience to describe the positional relationship between components. Typically, the positive z-axis direction is the upward vertical direction, and the x-y plane is a horizontal plane. The method for forming the strip grooves 12 is not limited. The strip grooves 12 may be formed by, e.g., press-forming or machining instead of rolling.

Figure 3:
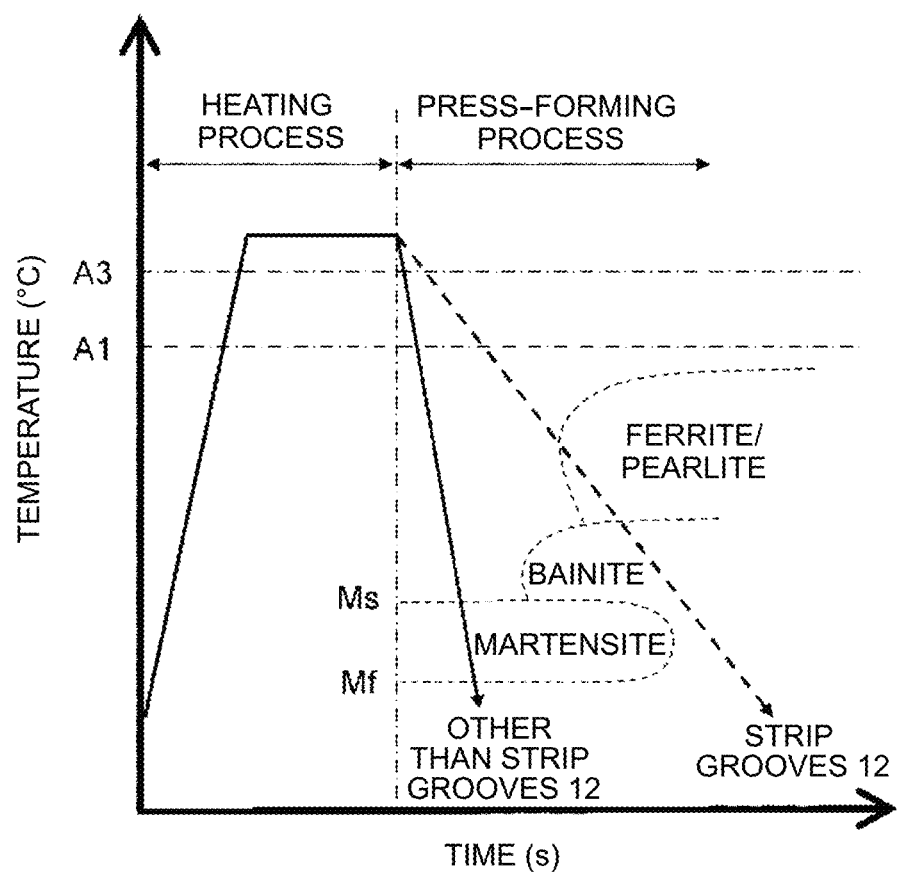
FIG. 3 is a schematic temperature chart for a heating process (step ST2) and a press-forming process (step ST3)

Next, the heating process (step ST2) of FIG. 1 will be described. FIG. 3 is a schematic temperature chart for the heating process (step ST2) and the press-forming process (step ST3). In FIG. 3, the abscissa represents time (s) and the ordinate represents temperature (° C.). As shown in FIG. 3, in the heating process (step ST2), the entire steel sheet 11 having the strip grooves 12 is heated to a temperature higher than an austenite transformation finish temperature A3.

The steel sheet 11 is heated in, e.g., a general-purpose heating furnace. In the heating process (step ST2), the microstructure of the entire sheet steel 11 transforms from ferrite and pearlite to single austenite phase. FIG. 3 also shows an austenite transformation start temperature A1.

Figure 4:
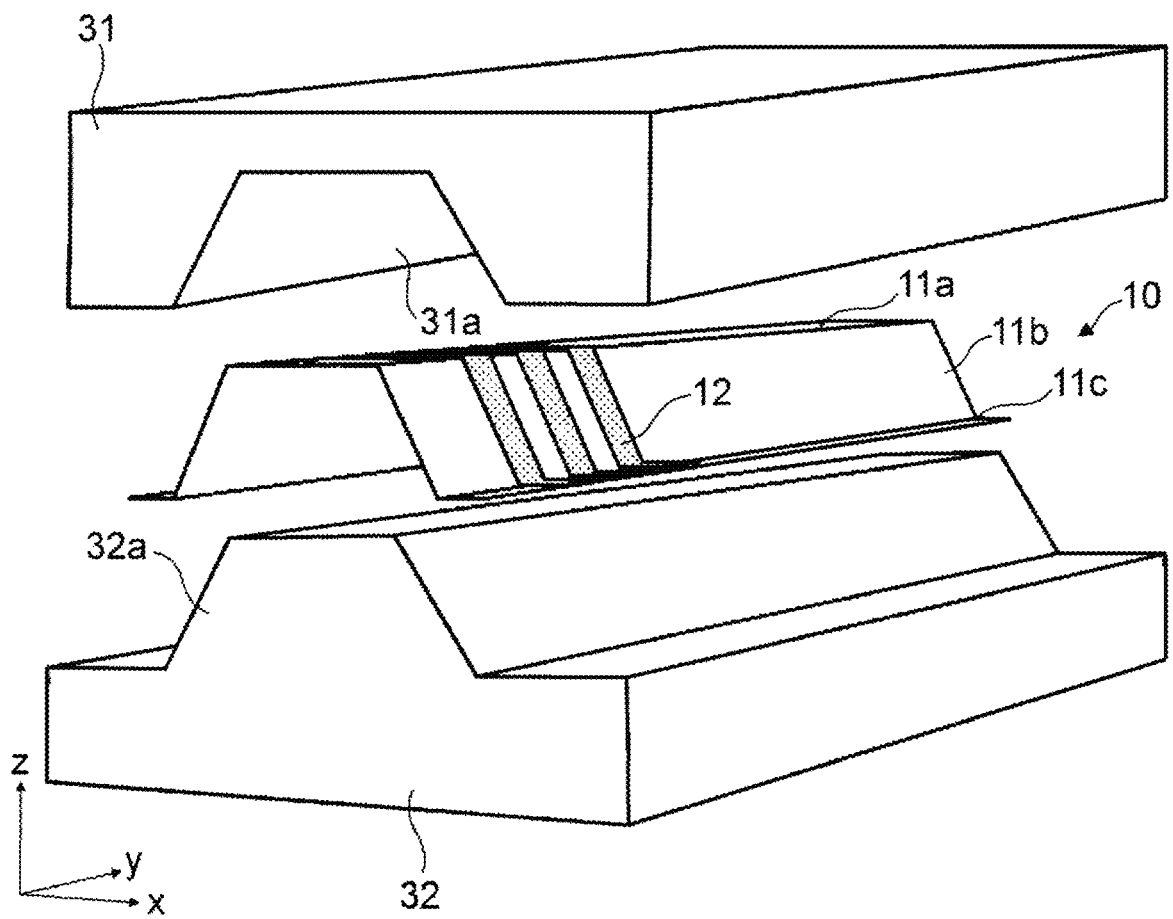
FIG. 4 is a perspective view illustrating an example of the press-forming process.

Lastly, the press-forming process (step ST3) of FIG. 1 will be described. FIG. 4 is a perspective view illustrating an example of the press-forming process. As shown in FIG. 4, in the press-forming process (step ST3), the heated steel sheet 11 is placed between an upper die 31 and a lower die 32 and is press-formed while cooling.

Since the press-forming process (step ST3) is hot press forming, springback that occurs in cold press forming is avoided, and a high-strength steel sheet member can be produced by quenching with the die (upper and lower dies 31, 32). Such hot pressing is usually called hot stamping. A steel sheet member 10 according to the first embodiment is produced by the press-forming process (step ST3).

The steel sheet member 10 shown in FIG. 4 includes a top plate 11a, sidewalls 11b, and flange portions 11c and has a hat-shaped section. The top plate 11a, the sidewalls 11b, and the flange portions 11c extend in the y-axis direction. More specifically, the top plate 11a extends in the y-axis direction, and the pair of sidewalls 11b extend downward from the ends in the lateral direction of the top plate 11a (the x-axis direction). The flange portions 11c extend outward from the lower ends (the ends in the negative z-axis direction) of the sidewalls 11b.

Accordingly, as shown in FIG. 4, the upper die 31 has a recessed portion 31a in its lower surface. The recessed portion 31a has a trapezoidal section and extends in the axial direction (y-axis direction). Similarly, the lower die 32 has a protruding portion 32a on its upper surface. The protruding portion 32a has a trapezoidal section and extends in the axial direction (y-axis direction). FIG. 4 illustrates the upper and lower dies 31, 32 being separated from each other after press-forming the steel sheet member 10.

Figure 5:
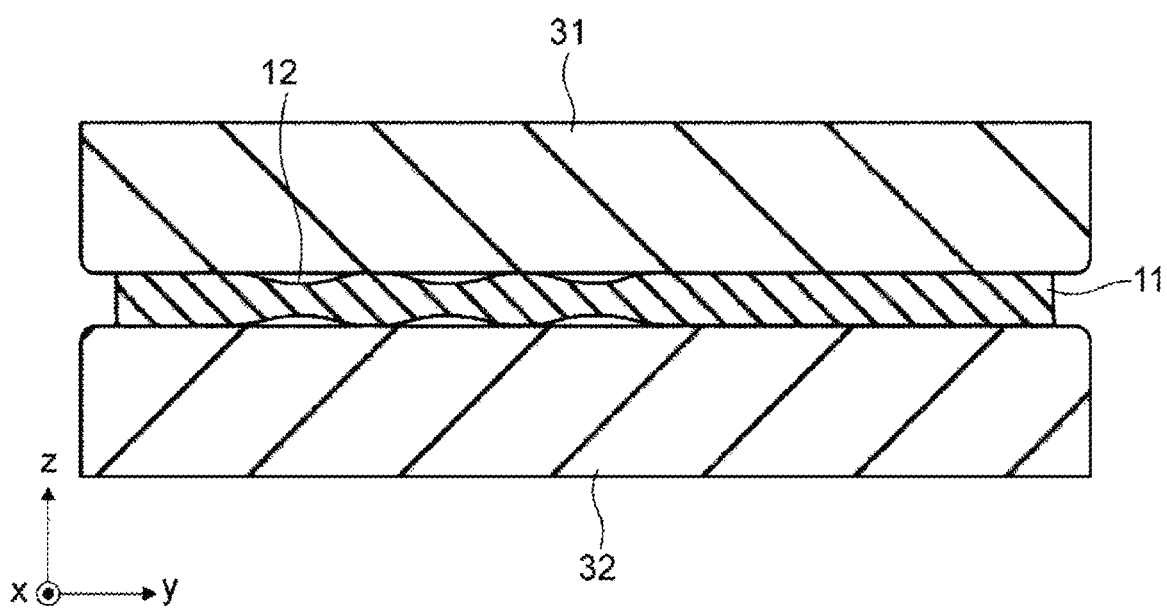
FIG. 5 is a sectional view of a steel sheet 11 being press-formed between an upper die 31 and a lower die 32 while cooling.

FIG. 5 is a sectional view of the steel sheet 11 being press-formed between the upper and lower dies 31, 32 while cooling. As shown in FIG. 5, there is space between each of the upper and lower dies 31, 32 and the bottom of each strip groove 12 during press forming. That is, the strip grooves 12 do not contact the upper and lower dies 31, 32.

As shown in the temperature chart of FIG. 3, those parts of the steel sheet 11 which are located between the opposing strip grooves 12 ("strip grooves 12" in FIG. 3) are cooled more slowly during press forming than those parts of the steel sheet 11 which are in contact with the upper die 31 or the lower die 32 and are directly cooled by the upper die 31 or the lower die 32 ("other than strip grooves 12" in FIG. 3).

FIG. 3 schematically shows a martensite transformation start temperature Ms, a martensite transformation finish temperature Mf, a bainite nose, and a ferrite/pearlite nose on a continuous cooling transformation (CCD) diagram. As shown by solid line in FIG. 3, those parts of the steel sheet 11 which are in contact with the upper die 31 or the lower die 32 and are therefore directly cooled by the upper die 31 or the lower die 32 ("other than strip grooves 12" in FIG. 3) are cooled at a higher rate than the upper critical cooling rate. Accordingly, martensitic transformation occurs and the entire microstructure of these parts transforms into hard martensite.

As shown by broken line in FIG. 3, those parts of the steel sheet 11 which are located between the opposing strip grooves 12 ("strip grooves 12" in FIG. 3) are cooled at a lower rate than the upper critical cooling rate. Accordingly, at least a part of the microstructure of these parts transforms into bainite or ferrite/pearlite rather than martensite. That is, those parts of the produced steel sheet member 10 which are located between the opposing strip grooves 12 have a smaller proportion of martensite in their microstructure than the other parts of the steel sheet member 10 in which no strip groove 12 is formed (hereinafter simply referred to as the "other parts"). Those parts of the steel sheet member 10 which are located between the opposing strip grooves 12 therefore have lower hardness and lower tensile strength than the other parts of the steel sheet member 10.

The cooling rate shown by dashed line in FIG. 3 is lower than the upper critical cooling rate, and the microstructure after cooling does not contain martensite. The microstructure transforms into ferrite/pearlite and bainite during cooling at this rate. However, the disclosure is not limited to this, and the microstructure after cooling may contain martensite. Since the hardness and tensile strength of the steel sheet member 10 are approximately proportional to each other, only the hardness will be described below.

As described above, in the method for producing a steel sheet member according to the present embodiment, at least one pair of opposing strip grooves 12 are formed in the opposite surfaces of the flat steel sheet 11 so as to extend in a direction crossing the longitudinal direction of the steel sheet 11. Accordingly, there is space between each of the upper and lower dies 31, 32 and the bottom of the strip groove 12 when press-forming the steel sheet member while cooling.

Accordingly, those parts of the steel sheet 11 which are located between the opposing strip grooves 12 are cooled more slowly than the other parts of the steel sheet 11, and those parts of the produced steel sheet member 10 which are located between the opposing strip grooves 12 thus have a smaller proportion of martensite in their microstructure and are softer than the other parts of the steel sheet member 10. That is, those parts of the steel sheet member 10 which are located between the opposing strip grooves 12 are softer and thinner than the other parts of the steel sheet member 10. These parts therefore tend to be deformed and have excellent shock absorption properties. As described above, a steel sheet member merely having the strip grooves 12, namely having a simpler, more compact configuration than a steel sheet member with a bellows structure etc., but still having excellent shock absorption properties can be easily produced.

Configuration of Steel Sheet Member

Figure 6:
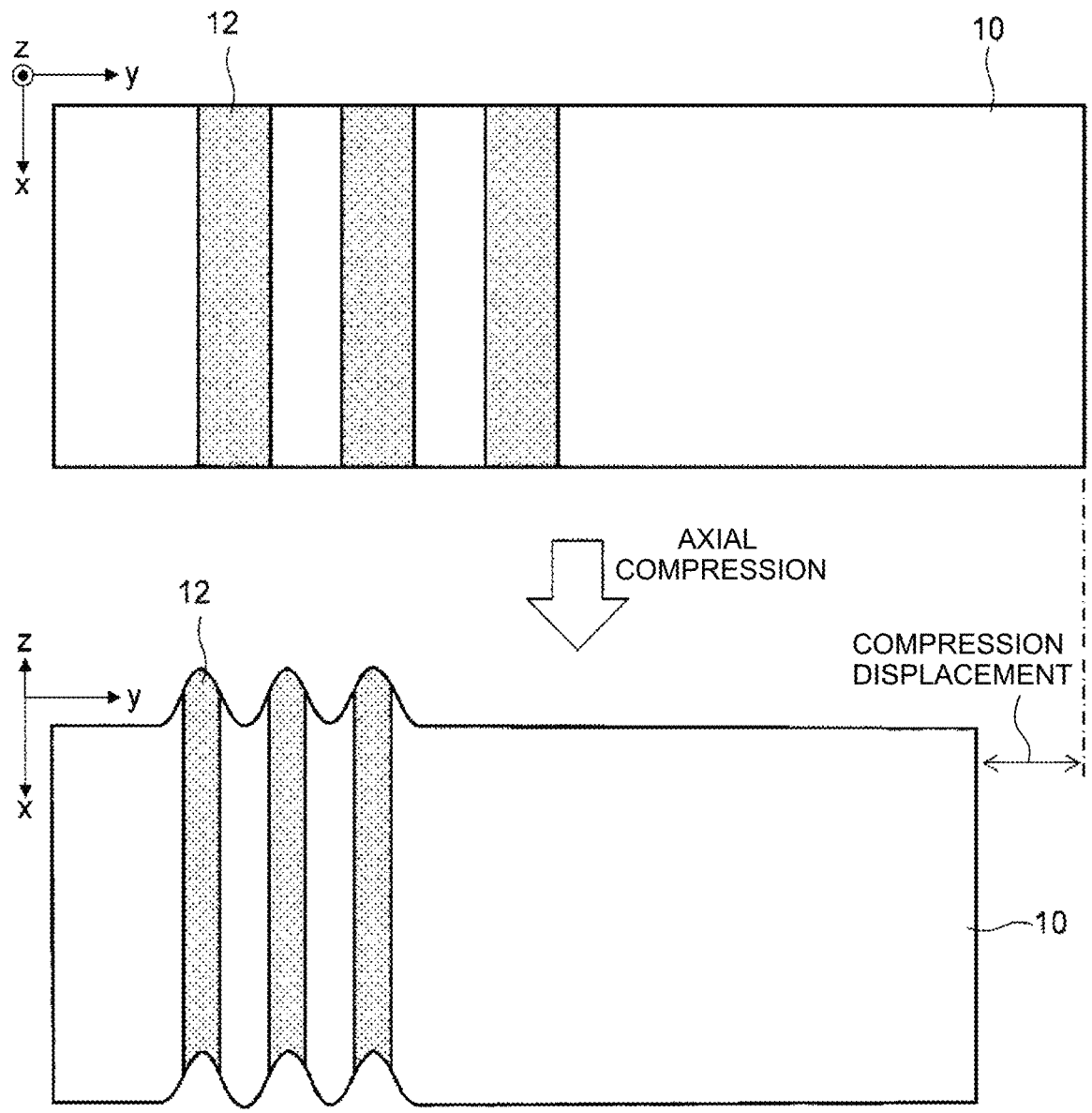
FIG. 6 shows a schematic plan view of an example of the steel sheet member according to the first embodiment and a schematic perspective view of the steel sheet member being deformed by axial compression.

Next, an example of the steel sheet member according to the first embodiment will be described with reference to FIG. 6. FIG. 6 shows a schematic plan view of an example of the steel sheet member according to the first embodiment and a schematic perspective view of the steel sheet member being deformed by axial compression. The steel sheet member of this example is a steel sheet member produced by the production method according to the first embodiment shown in FIG. 1. The steel sheet member 10 shown in FIG. 4 has a hat-shaped section perpendicular to its longitudinal direction, while the steel sheet member 10 shown in FIG. 6 has a simpler shape, namely a flat sheet shape. The steel sheet member 10 shown in FIG. 6 is, e.g., a vehicle floor member.

As shown in the upper part of FIG. 6, the steel sheet member 10 according to the first embodiment has at least one pair of opposing strip grooves 12 in its upper and lower surfaces, and the strip grooves 12 extend in a direction crossing the longitudinal direction of the steel sheet member 10 (the y-axis direction). In the example of FIG. 6, the strip grooves 12 extend in a direction perpendicular to the longitudinal direction of the steel sheet member 10 (i.e., extend in the x-axis direction). In the example of FIG. 6, the steel sheet member 10 has three pairs of opposing strip grooves 12 in its upper and lower surfaces. However, the number of strip grooves 12 is not particularly limited.

As described above, the microstructure of those parts (first part) of the steel sheet member 10 which are located between the opposing strip grooves 12 contain bainite or ferrite/pearlite. The entire microstructure of the other parts (second part) of the steel sheet member 10 is comprised of martensite. That is, those parts of the steel sheet member 10 which are located between the opposing strip grooves 12 have a smaller proportion of martensite in their microstructure than the other parts of the steel sheet member 10 and are softer than the other parts of the steel sheet member 10. Moreover, those parts of the steel sheet member 10 which are located between the opposing strip grooves 12 are thinner than the other parts of the steel sheet member 10.

As described above, those parts of the steel sheet member 10 which are located between the opposing strip grooves 12 are softer and thinner than the other parts of the steel sheet member 10 and therefore tend to be deformed. For example, as shown in the lower part of FIG. 6, when an axial compressive load is applied to the steel sheet member 10 in the longitudinal direction of the steel sheet member 10 (the y-axis direction), those parts of the steel sheet member 10 which are located between the opposing strip grooves 12 (in the example of FIG. 6, three parts) are buckled preferentially.

Figure 7:
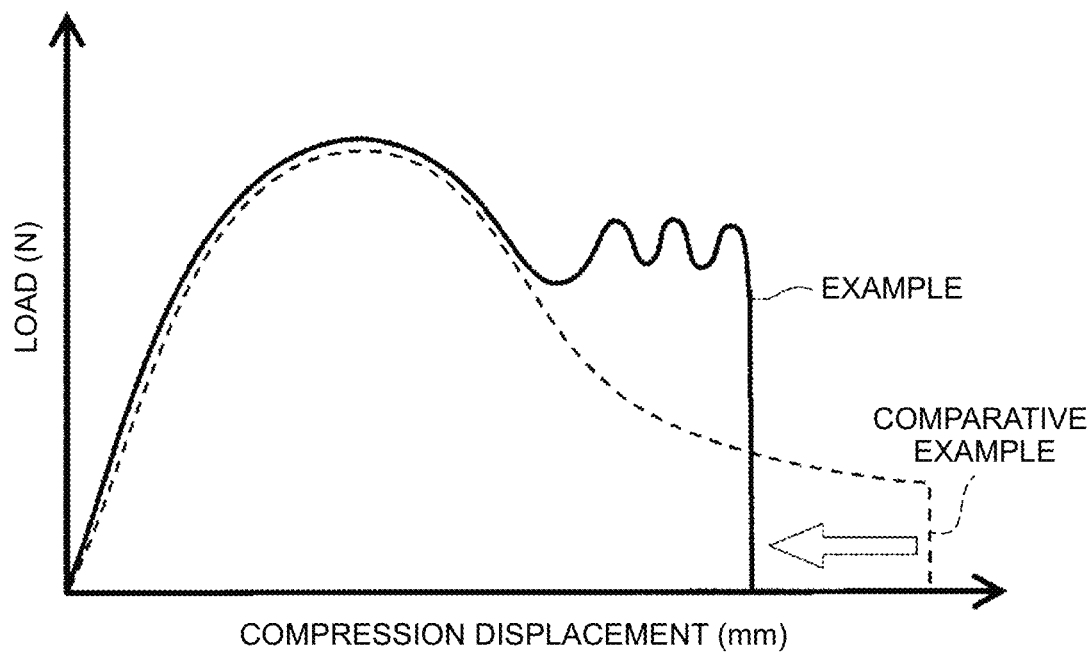
FIG. 7 is a graph schematically showing load-displacement curves of an example according to the first embodiment and a comparative example.

FIG. 7 is a graph schematically showing load-displacement curves of an example according to the first embodiment and a comparative example. In FIG. 7, the abscissa represents compression displacement (mm) and the ordinate represents load (N). In FIG. 7, solid line represents a load-displacement curve of the example, and broken line represents a load-displacement curve of the comparative example. The area of the region surrounded by the load-displacement curve represents energy absorption. FIG. 7 illustrates the case where the peak load and the energy absorption are the same between the example and the comparative example.

The comparative example is a steel sheet member 10 having no strip groove 12 and having a uniform overall thickness and uniform overall hardness. Even when subjected to an axial compressive force in the longitudinal direction of the steel sheet member, the steel sheet member of the comparative example is not deformed in the axial collapse mode but is deformed in the bending collapse mode as in the case where the steel sheet member is subjected to a load in the direction perpendicular to the longitudinal direction of the steel sheet member. Accordingly, as shown in FIG. 7, once buckling occurs, the load decreases rapidly, and displacement that occurs until the steel sheet member 10 absorbs a predetermined amount of energy is large.

As shown in FIG. 6, the steel sheet member 10 of the example has the strip grooves 12 extending in a direction perpendicular to the longitudinal direction of the steel sheet member 10 (the y-axis direction) (i.e., extending in the x-axis direction). As described above, those parts of the steel sheet member 10 which are located between the opposing strip grooves 12 tend to be deformed. As shown in FIG. 6, the steel sheet member 10 of the example is therefore deformed in the axial collapse mode when subjected to an axial compressive load.

Accordingly, as shown in FIG. 7, even when buckling occurs, the load does not decrease rapidly, and the steel sheet member is buckled repeatedly. Accordingly, displacement that occurs until the steel sheet member absorbs a predetermined amount of energy is smaller than that of the comparative example. For example, when the steel sheet member 10 is a steel sheet member for vehicles, displacement in the event of a collision is reduced, and the vehicle will have a larger safe space.

The steel sheet members 10 according to the present embodiment shown in FIGS. 4 and 6 merely have at least one pair of strip grooves 12 in order to improve shock absorption properties. These steel sheet members 10 have a simpler, more compact configuration than the steel sheet member with a bellows structure described in JP 2003-312534 A, etc. but still have excellent shock absorption characteristics.

The direction in which the strip grooves 12 extend and the longitudinal direction of the steel sheet member 10 need only cross each other (i.e., the strip grooves 12 may extend at any angle with respect to the longitudinal direction of the steel sheet member 10 as long as the strip grooves 12 are not parallel to the longitudinal direction). However, in order for the steel sheet member 10 to be deformed in the axial collapse mode, it is preferable that the angle between these two directions be, e.g., 45° to 90°. The larger the number of strip grooves 12 is, the further the shock absorption properties are improved.

Specific Examples of Steel Sheet Member

Figure 8:
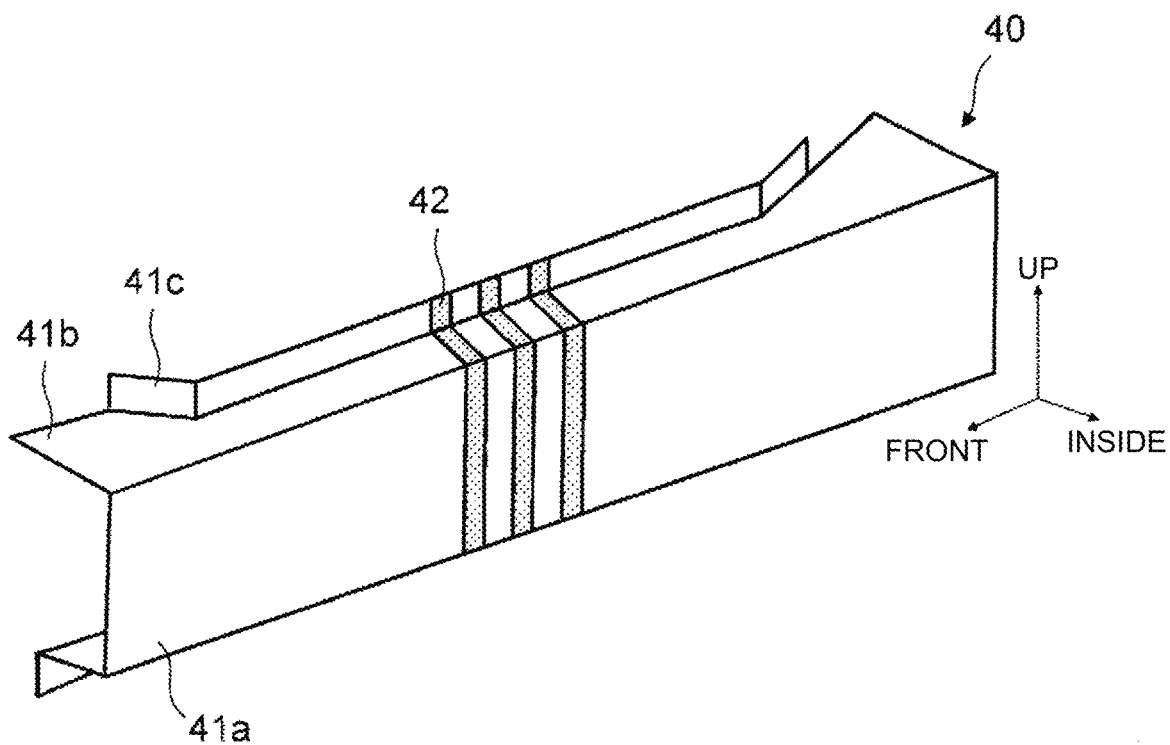
FIG. 8 is a perspective view of a specific example of the steel sheet member according to the first embodiment.
Figure 9:
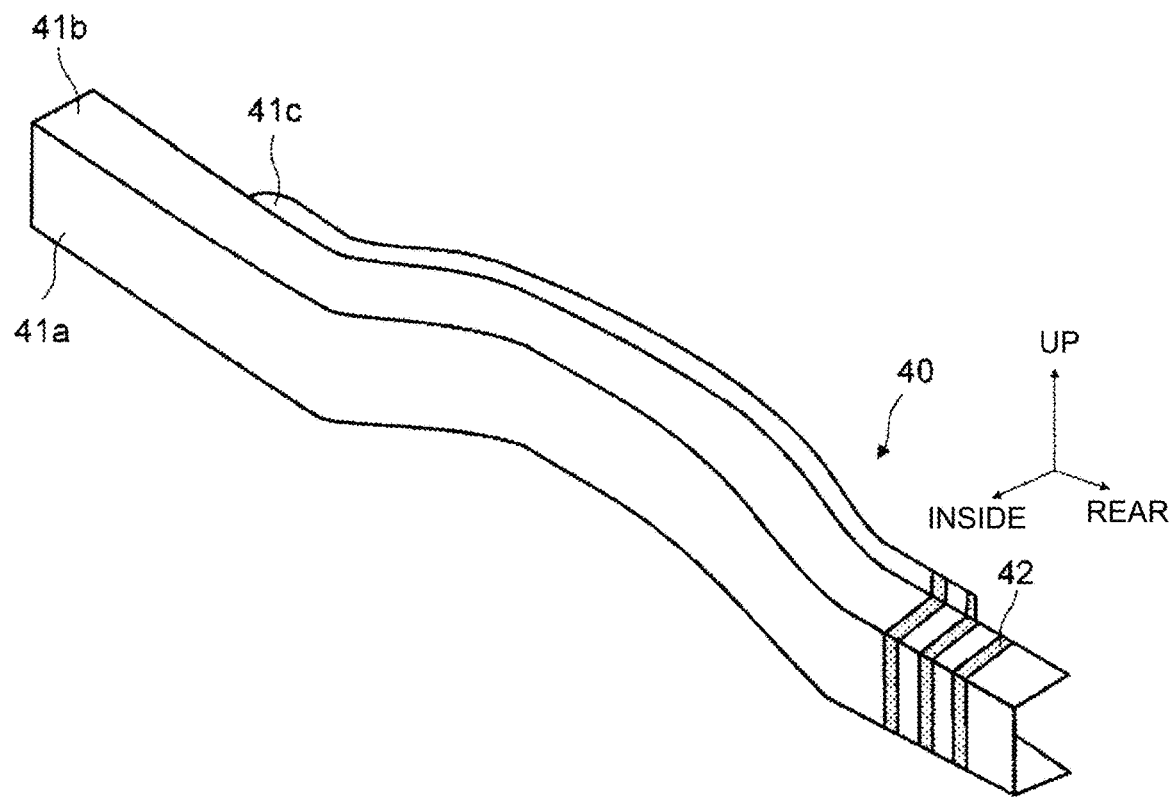
FIG. 9 is a perspective view of another specific example of the steel sheet member according to the first embodiment.
Figure 10:
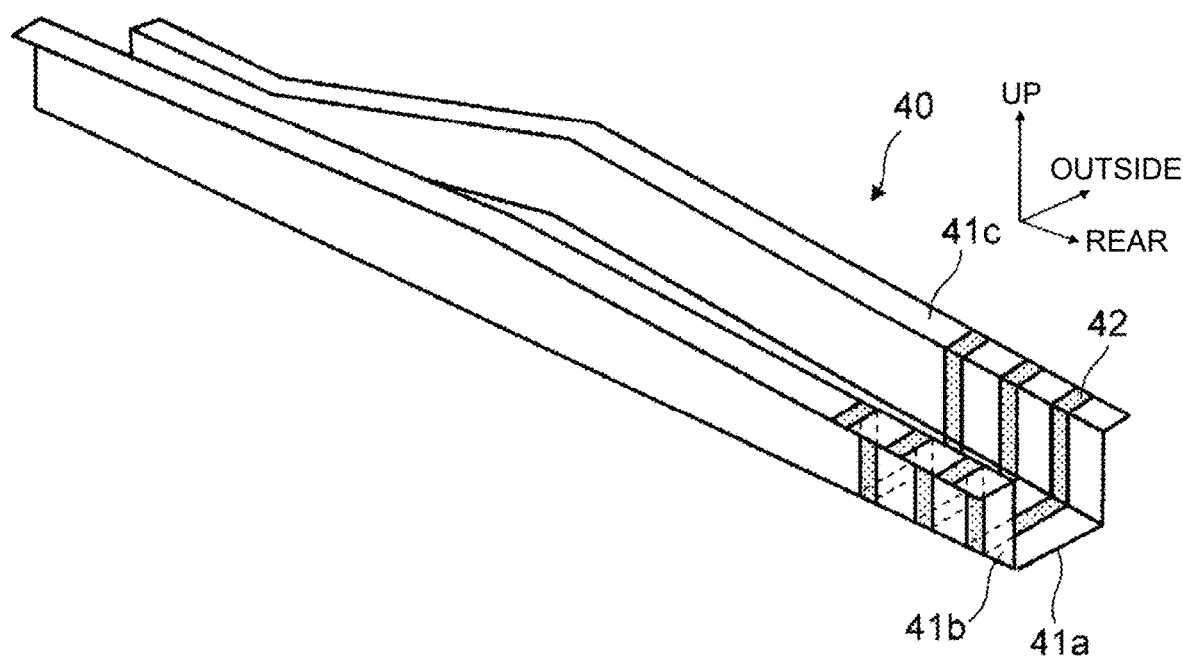
FIG. 10 is a perspective view of still another specific example of the steel sheet member according to the first embodiment.

The configurations of specific examples of the steel sheet member according to the first embodiment will be described with reference to FIGS. 8 to 10. FIGS. 8 to 10 are perspective views of specific examples of the steel sheet member according to the first embodiment. The steel sheet members of these specific examples are steel sheet members produced by the production method according to the first embodiment. Steel sheet members 40 shown in FIGS. 8 to 10 are examples of a side member that is a vehicle member. Arrows in FIGS. 8 to 10 indicate the directions in a vehicle. The use and shape of each of the steel sheet members 40 shown in FIGS. 8 to 10 are by way of illustration only, and the use and shape of the steel sheet member according to the present embodiment are not limited.

The steel sheet member 40 shown in FIG. 8 is a front side member inner. The steel sheet member 40 shown in FIG. 8 includes a top plate 41a, sidewalls 41b, and flange portions 41c and has a hat-shaped section. The top plate 41a, the sidewalls 41b, and the flange portions 41c extend in the longitudinal direction of the vehicle. More specifically, the top plate 41a extends in the longitudinal direction of the vehicle, and the pair of sidewalls 41b extend outward from the ends in the lateral direction of the top plate 41a. Each flange portion 41c extends outward (i.e., upward or downward in FIG. 8) from an end of a corresponding one of the sidewalls 41b.

The steel sheet member 40 has strip grooves 42 in its middle part in the longitudinal direction of the steel sheet member 40. The strip grooves 42 extend perpendicularly to the longitudinal direction of the steel sheet member 40, namely extend in the lateral direction of the steel sheet member 40 (the vertical direction). The strip grooves 42 are formed in the inner and outer surfaces (upper and lower surfaces during production) of the steel sheet member 40 so as to face each other. In the example of FIG. 8, the steel sheet member 40 has three pairs of opposing strip grooves 42 in its upper and lower surfaces.

As described above, those parts of the steel sheet member 40 which are located between the opposing strip grooves 42 are softer and thinner than the other parts of the steel sheet member 40 and therefore tend to be deformed. For example, when an axial compressive load is applied to the steel sheet member 40 in the longitudinal direction of the steel sheet member 40, those parts of the steel sheet member 40 which are located between the opposing strip grooves 42 are preferentially buckled inward and thus absorb shock in the axial collapse mode. The steel sheet member 40 may have any number of strip grooves 42, and the positions of the strip grooves 42 may be changed as appropriate in the longitudinal direction of the vehicle.

The steel sheet member 40 shown in FIG. 9 is a rear side member for front-engine, rear-wheel drive (FR) vehicles. The steel sheet member 40 shown in FIG. 9 includes a top plate 41*a*, sidewalls 41*b*, and flange portions 41*c* and has a hat-shaped section. The top plate 41*a*, the sidewalls 41*b*, and the flange portions 41*c* extend in the longitudinal direction of the vehicle. More specifically, the top plate 41*a* extends in the longitudinal direction of the vehicle, and the pair of sidewalls 41*b* extend outward from the ends in the lateral direction of the top plate 41*a*. Each flange portion 41*c* extends outward (i.e., toward the upper side or lower side of the vehicle) from an end of a corresponding one of the sidewalls 41*b*.

The steel sheet member 40 has strip grooves 42 in its rear part. The strip grooves 42 extend perpendicularly to the longitudinal direction of the steel sheet member 40, namely extend in the lateral direction of the steel sheet member 40 (the vertical direction). The strip grooves 42 are formed in the inner and outer surfaces (upper and lower surfaces during production) of the steel sheet member 40 so as to face each other. In the example of FIG. 9, the steel sheet member 40 has three pairs of opposing strip grooves 42 in its upper and lower surfaces.

As described above, those parts of the steel sheet member 40 which are located between the opposing strip grooves 42 are softer and thinner than the other parts of the steel sheet member 40 and therefore tend to be deformed. For example, when an axial compressive load is applied to the steel sheet member 40 in the longitudinal direction of the steel sheet member 40, those parts of the steel sheet member 40 which are located between the opposing strip grooves 42 are preferentially buckled inward and thus absorb shock in the axial collapse mode. The steel sheet member 40 may have any number of strip grooves 42, and the positions of the strip grooves 42 may be changed as appropriate in the longitudinal direction of the vehicle.

The steel sheet member 40 shown in FIG. 10 is a rear side member for front-engine, front-wheel drive (FF) vehicles. The steel sheet member 40 shown in FIG. 10 includes a top plate 41*a*, sidewalls 41*b*, and flange portions 41*c* and has a hat-shaped section. The top plate 41*a*, the sidewalls 41*b*, and the flange portions 41*c* extend in the longitudinal direction of the vehicle. More specifically, the top plate 41*a* extends in the longitudinal direction of the vehicle, and the pair of sidewalls 41*b* extend upward from the ends in the lateral direction of the top plate 41*a*. Each flange portion 41*c* extends outward (i.e., toward the inner side or outer side of the vehicle) from an end of a corresponding one of the sidewalls 41*b*.

The steel sheet member 40 has strip grooves 42 in its rear part. The strip grooves 42 extend perpendicularly to the longitudinal direction of the steel sheet member 40, namely extend in the lateral direction of the steel sheet member 40 (the vertical direction). The strip grooves 42 are formed in the inner and outer surfaces (upper and lower surfaces during production) of the steel sheet member 40 so as to face each other. In the example of FIG. 10, the steel sheet member 40 has three pairs of opposing strip grooves 42 in its upper and lower surfaces.

As described above, those parts of the steel sheet member 40 which are located between the opposing strip grooves 42 are softer and thinner than the other parts of the steel sheet member 40 and therefore tend to be deformed. For example, when an axial compressive load is applied to the steel sheet member 40 in the longitudinal direction of the steel sheet member 40, those parts of the steel sheet member 40 which are located between the opposing strip grooves 42 are preferentially buckled inward and thus absorb shock in the axial collapse mode. The steel sheet member 40 may have any number of strip grooves 42, and the positions of the strip grooves 42 may be changed as appropriate in the longitudinal direction of the vehicle.

Further Specific Example of Steel Sheet Member

Figure 11:
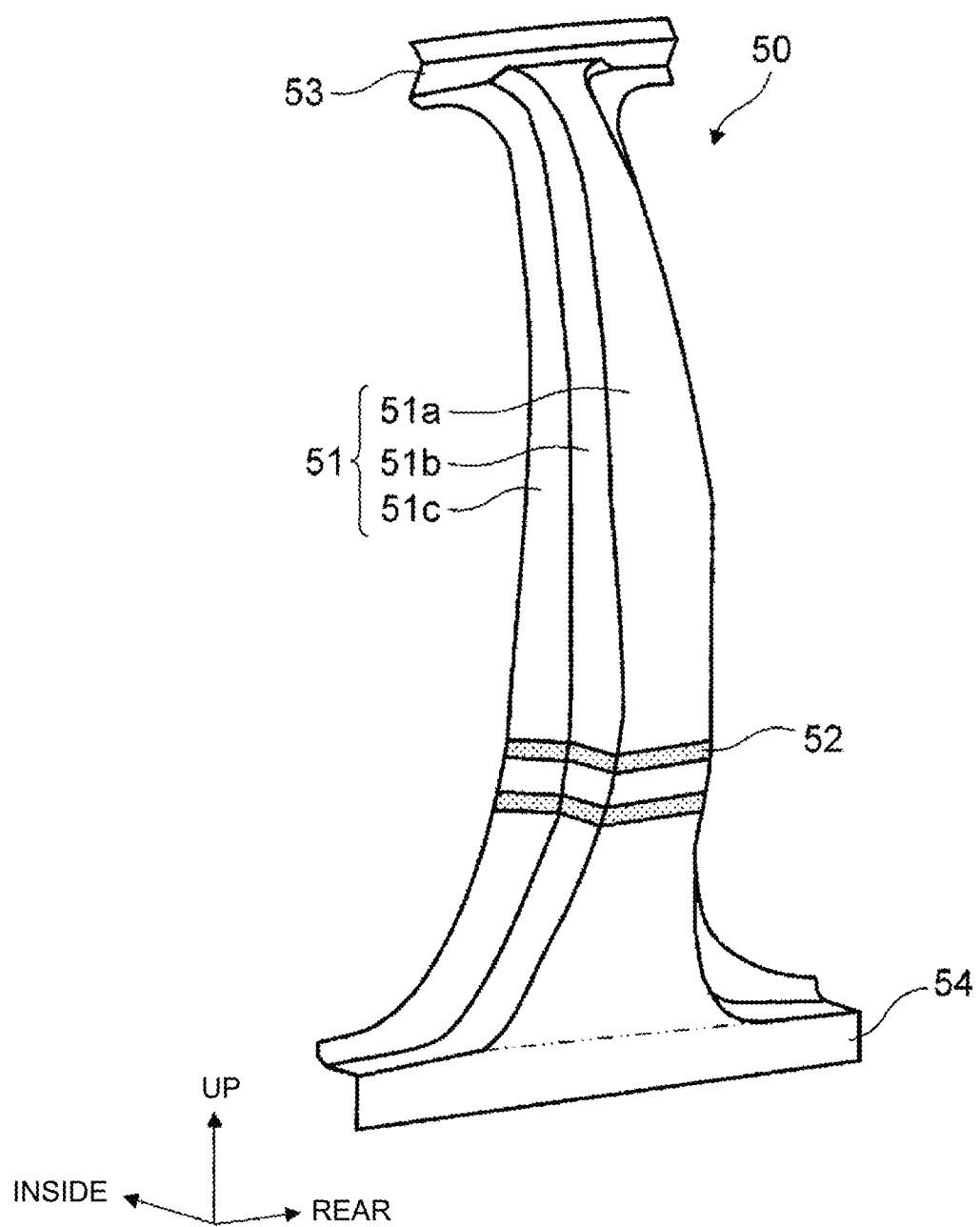
FIG. 11 is a perspective view of a further specific example of the steel sheet member according to the first embodiment.

The configurations of a further specific example of the steel sheet member according to the first embodiment will be described with reference to FIG. 11. FIG. 11 is a perspective view of a further specific example of the steel sheet member according to the first embodiment. The steel sheet member of this specific example is a steel sheet member produced by the production method according to the first embodiment. A steel sheet member 50 shown in FIG. 11 is a steel sheet member for pillars, which is a vehicle member, and more specifically, a center pillar reinforcement. Arrows in FIG. 11 indicate the directions in a vehicle. The use and shape of the steel sheet member 50 shown in FIG. 11 is by way of illustration only, and the use and shape of the steel sheet member according to the present embodiment are not limited.

As shown in FIG. 11, the steel sheet member 50 according to the second embodiment includes a body portion 51, an upper flange portion 53, and a lower flange portion 54. As shown in FIG. 11, the body portion 51 is a portion including a top plate 51*a*, sidewalls 51*b*, and flange portions 51*c* and has a hat-shaped section. The top plate 51*a*, the sidewalls 51*b*, and the flange portions 51*c* extend in the vertical direction. More specifically, the top plate 51*a* extends in the vertical direction, and the pair of sidewalls 51*b* extend inward from the ends in the lateral direction of the top plate 51*a*. Each flange portion 51*c* extends outward (i.e., toward the front side or rear side of the vehicle) from an end of a corresponding one of the sidewalls 51*b*.

The body portion 51 is slightly curved so as to protrude outward as a whole. The upper and lower ends of the body portion 51 are extended in the lateral direction (the longitudinal direction of the vehicle) so as to have a T-shape as viewed in plan. The lower end of the body portion 51 is longer in the lateral direction of the body portion 51 (the longitudinal direction of the vehicle) than the upper end of the body portion 51.

The upper flange portion 53 includes a plate portion standing outward from the upper end of the body portion 51 and a plate portion extending upward (outward in the longitudinal direction of the body portion 51) from the outer end of that plate portion. That is, the upper flange portion 53 is a portion extending in the lateral direction of the body portion 51 (the longitudinal direction of the vehicle) and having an L-shaped section. The lower flange portion 54 is a flat sheet-like portion extending downward (outward in the longitudinal direction of the body portion 51) from the lower end of the top plate 51a and also extending in the lateral direction of the body portion 51 (the longitudinal direction of the vehicle).

The steel sheet member 50 has strip grooves 52 in the lower part of the body portion 51. The strip grooves 52 extend perpendicularly to the longitudinal direction of the body portion 51, namely extend in the lateral direction of the body portion 51 (the longitudinal direction of the vehicle). The strip grooves 52 are formed in the inner and outer surfaces (upper and lower surfaces during production) of the body portion 51 so as to face each other. In the example of FIG. 11, the steel sheet member 50 has two pairs of opposing strip grooves 52 in the upper and lower surfaces of the body portion 51.

As described above, those parts of the steel sheet member 50 which are located between the opposing strip grooves 52 are softer and thinner than the other parts of the steel sheet member 50 and therefore tend to be deformed. For example, when a bending load is applied to the steel sheet member 50 in the direction from the outside toward the inside of the steel sheet member 50, those parts of the steel sheet member 50 which are located between the opposing strip grooves 52 are preferentially bent inward and thus absorb shock in the bending collapse mode. The steel sheet member 50 may have any number of strip grooves 52, and the positions of the strip grooves 52 may be changed as appropriate in the vertical direction.

Example

An example of the steel sheet member according to the first embodiment will be described. The steel sheet member of the example is such a flat sheet-like steel sheet member as shown in FIG. 6. First, strip grooves 12 were formed in a steel sheet for hot stamping made of manganese-boron steel (22MnB5 steel) and having a thickness of 2.0 mm, a width of 50 mm, and a length of 165 mm. The resultant steel sheet was held at 900° C. for one minute to austenitize the entire steel sheet. The austenitized steel sheet was then placed in a die (between upper and lower dies) and quenched.

Figure 12:
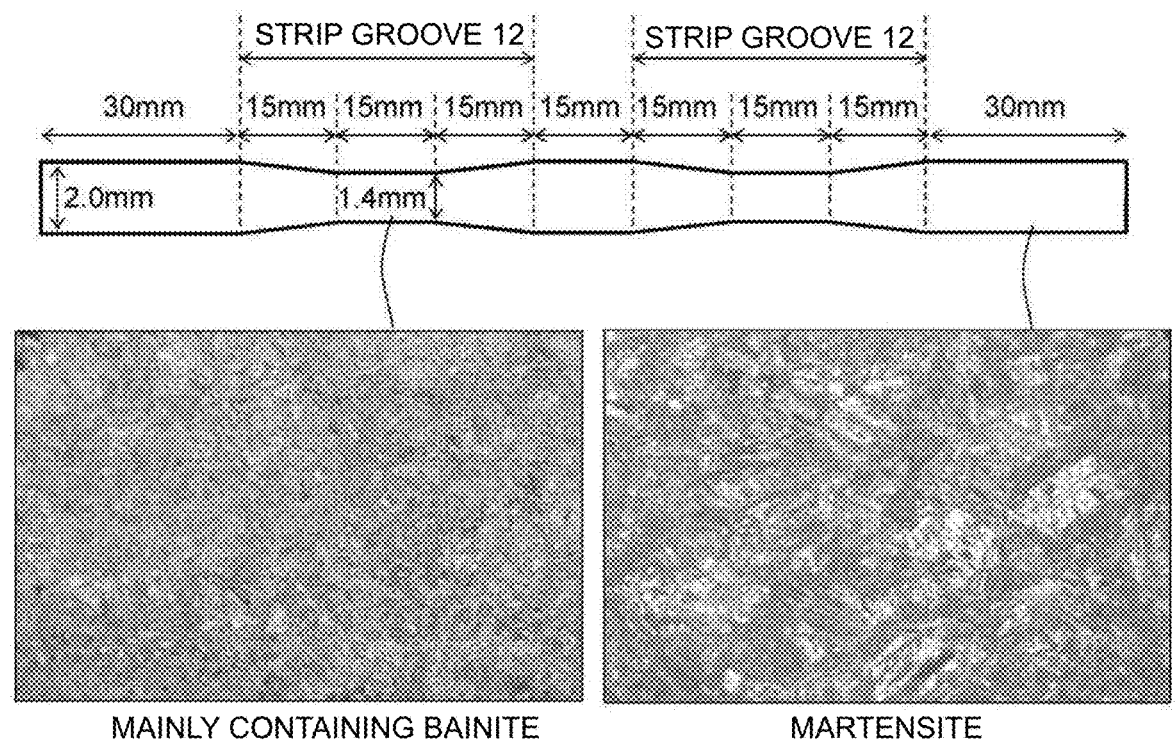
FIG. 12 shows a longitudinal section of a steel sheet member of an example and images of the microstructure of this steel sheet member.

FIG. 12 shows a longitudinal section of the steel sheet member of the example and images of the microstructure of this steel sheet member. As shown in FIG. 12, two pairs of strip grooves 12 having an isosceles trapezoidal section were formed in the upper and lower surfaces of the steel sheet so as to face each other. The width of the bottom surface of each strip groove 12 is 15 mm, and the width at the upper or lower end of each strip groove 12 is 45 mm. That is, each strip groove 12 is tapered from the upper or lower end toward the bottom. Each strip groove 12 has a depth of 0.3 mm. That is, those parts of the steel sheet member which are located between the bottom surfaces of the opposing strip grooves 12 formed in the upper and lower surfaces have a thickness of 1.4 mm.

Those parts of the steel sheet member which have the strip grooves 12 do not contact the die during cooling and are therefore cooled slowly. Those parts of the steel sheet member which are located between the bottom surfaces of the opposing strip grooves 12 were cooled particularly slowly, and therefore, the microstructure of these parts contains martensite but mainly contains bainite as shown in FIG. 12. On the other hand, the other parts of the steel sheet member which do not have the strip grooves 12 contact the die during cooling and are therefore cooled quickly. Accordingly, the microstructure of the other parts is comprised only of martensite.

Figure 13:
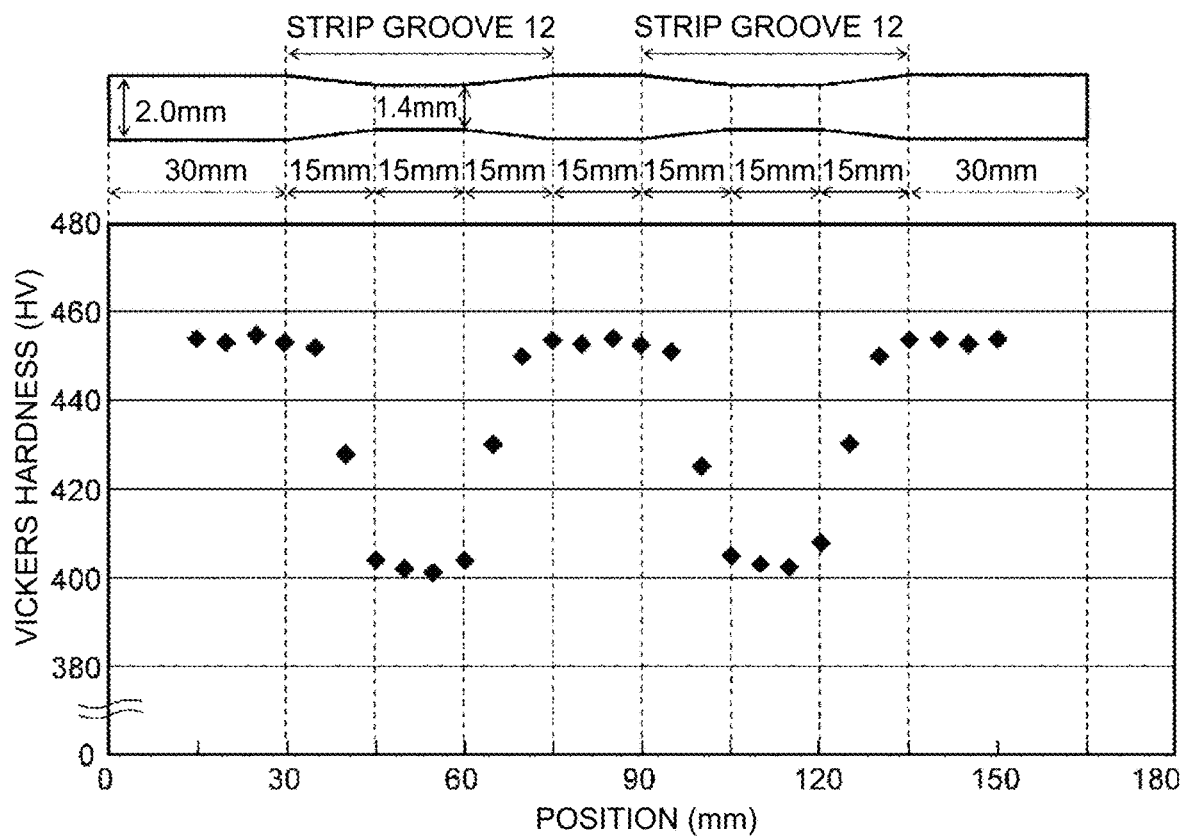
FIG. 13 is a graph illustrating hardness distribution in the steel sheet member of the example.

FIG. 13 is a graph illustrating hardness distribution in the steel sheet member of the example. FIG. 13 also shows a longitudinal section of the steel sheet member of the example. In FIG. 13, the abscissa represents the position (mm) in the longitudinal direction of the steel sheet member, and the ordinate represents Vickers hardness (HV).

As described above, the microstructure of those parts of the steel sheet member which are located between the bottom surfaces of the opposing strip grooves 12 mainly contains bainite. Accordingly, as shown in FIG. 13, the Vickers hardness (HV) of these parts was about 400 HV. The microstructure of the other parts of the steel sheet member which do not have the strip grooves 12 is comprised only of martensite. Accordingly, as shown in FIG. 13, the Vickers hardness (HV) of the other parts of the steel sheet member was about 450 HV.

As described above, in the steel sheet member of the example, those parts of the steel sheet member which are located between the bottom surfaces of the opposing strip grooves 12 are softer and thinner than the other parts of the steel sheet member and therefore tend to be deformed. For example, when an axial compressive load is applied to the steel sheet member in the longitudinal direction of the steel sheet member, those parts of the steel sheet member which are located between the bottom surfaces of the opposing strip grooves 12 are preferentially buckled inward and thus absorb shock in the axial collapse mode. As described in the example, a steel sheet member merely having the strip grooves 12, namely having a simpler, more compact configuration than a steel sheet member with a bellows structure etc., but still having excellent shock absorption properties was able to be easily produced.

The disclosure is not limited to the above embodiment, and various modifications can be made as appropriate without departing from the spirit and scope of the disclosure.

What is claimed is:

1. A steel sheet member, comprising:
   at least one pair of opposing strip grooves formed in the steel sheet member such that one of the pair of opposing strip grooves is disposed in one of opposite surfaces of the steel sheet member, the other of the pair of opposing strip grooves is disposed in the other of the opposite surfaces, and the strip grooves extend in a direction crossing a longitudinal direction of the steel sheet member at an angle between 45 to 90 degrees, wherein
   a first part of the steel sheet member which is located between the opposing strip grooves is thinner and softer than a second part of the steel sheet member which does not have the strip grooves.

2. The steel sheet member according to claim 1, wherein the first part has a smaller proportion of martensite in a microstructure than the second part.

3. The steel sheet member according to claim 1, wherein a plurality of the pairs of strip grooves are formed at predetermined intervals in the longitudinal direction.

4. The steel sheet member according to claim 1, wherein the strip grooves extend in a direction perpendicular to the longitudinal direction.

5. The steel sheet member according to claim 1, wherein the steel sheet member is a vehicle member having a hat-shaped section perpendicular to the longitudinal direction.

* * * * *